A. H. G. GIRLING.
FRICTION CLUTCH.
APPLICATION FILED JUNE 17, 1920.
1,437,412.
Patented Dec. 5, 1922.
2 SHEETS—SHEET 1.
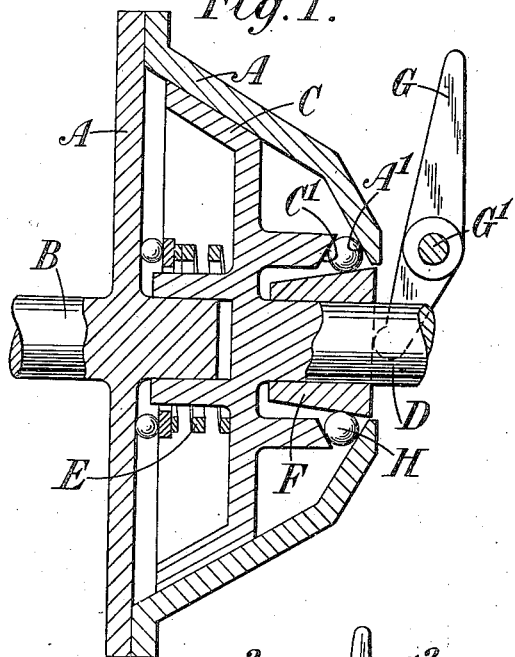
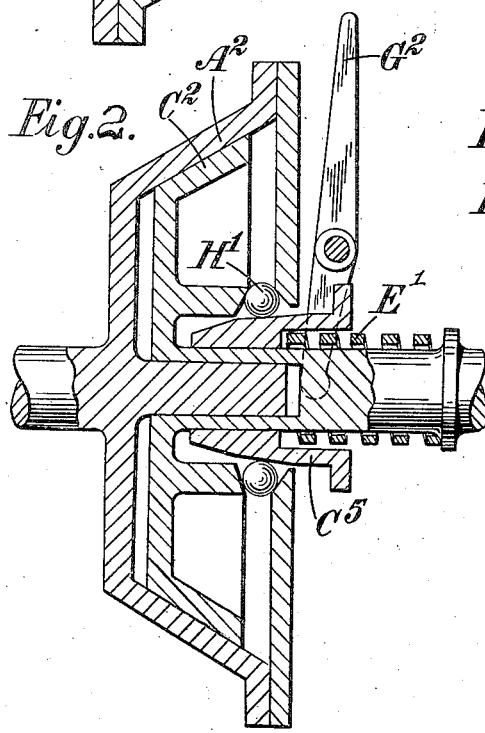
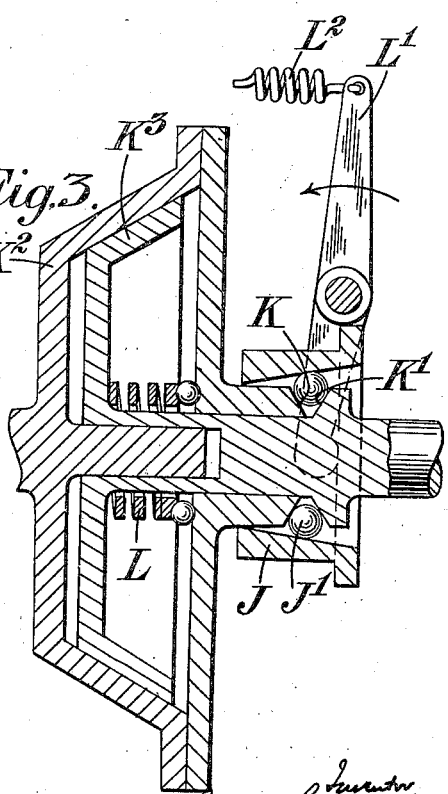
Inventor,
Albert Henry Godfrey Girling,
by Bakewell, Byrnes & Parmelee,
Attorneys.

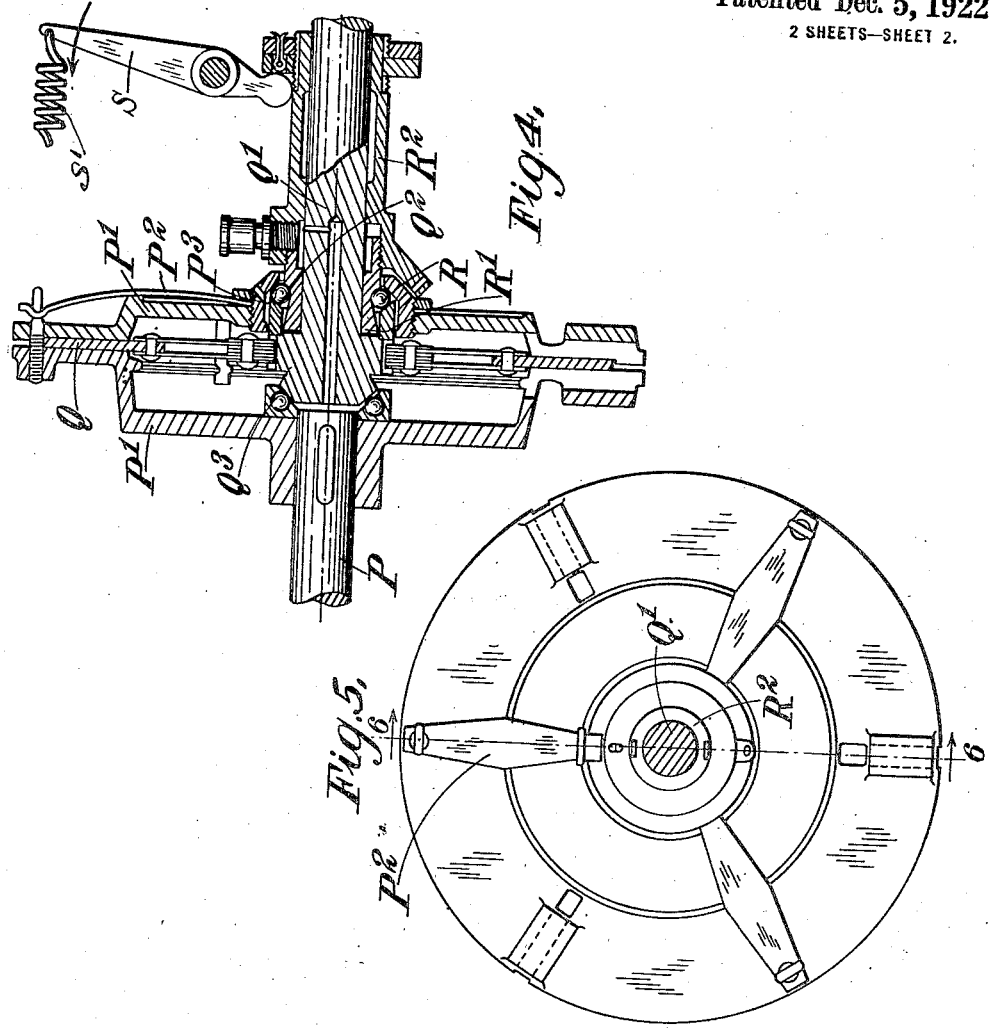

Patented Dec. 5, 1922.

1,437,412

UNITED STATES PATENT OFFICE.

ALBERT HENRY GODFREY GIRLING, OF LONDON, ENGLAND.

FRICTION CLUTCH.

Application filed June 17, 1920. Serial No. 389,663.

*To all whom it may concern:*

Be it known that I, ALBERT HENRY GODFREY GIRLING, a subject of the King of England, residing at London, in England, have invented certain new and useful Improvements in Friction Clutches, of which the following is a specification.

This invention is for friction clutches and has for its object to provide an improved control-means therefor, one of the principal objects of which is to enable the clutch to be so built that it may at all times be brought into action gradually. The invention particularly applies to clutches for motor cars, though it is not restricted to this application. As is well known the ordinary cone-clutches used for motor-cars are usually "thrown out," by separating the cones against the action of a spring and are "let in" by reversing the movement of the operating member so that the spring causes the one cone to be thrust against the other. It is often difficult to so control the operating member that the cone which is on the driving shaft gradually picks up the cone on the driven shaft, so that the vehicle is started without shock. A friction clutch provided with the control mechanism hereinafter described can at all times be gradually brought into operation, though the angles of the parts may be such, if desired, that this gradual clutching of the parts depends upon the rate of movement of the operating member; the prime object of the invention, however, is to provide a control-mechanism which is not dependent upon the rate of movement of the operating member for clutching.

In the accompanying drawings:

Figures 1–4 are longitudinal sections through different forms of clutches constructed according to this invention, the section in each case being taken along the axis of rotation, and Figure 5 is an elevation of the clutch shown in Figure 4 viewed from the right of that figure.

Referring to Figure 1, the clutch member A is carried fast on the engine-shaft B and co-operates with a clutch-member C which is carried fast on a driven-shaft D. A spring E tends always to urge the clutch member C into operative engagement with the clutch member A.

For separating the clutch members, a cone F is provided which can slide endwise on the shaft D and can be moved inwards towards the clutch member C by an operating member G pivoted at $G^1$. Surrounding the cone F is a ring of balls H, all of which balls are in engagement with the face of the cone F and also with a conical face $A^1$ on the clutch member A and another conical face $C^1$ on the clutch member C.

It will be seen from the above that the balls H constitute wedging bodies between the surfaces $A^1$ and $C^1$ of the clutch members and the face of the cone F. By driving the cone inwards by means of the lever G the balls are forced further away from the axis of rotation of the clutch and are thus further wedged in between the faces $A^1$ and $C^1$ so that the member C is displaced along the axis of rotation against the action of the spring E and is so disengaged from the clutch member A. The driven-shaft D must of course be provided with means for allowing of this axial movement.

The surface of the cone F and the faces $A^1$ and $C^1$ preferably lie at such angles relatively to one another that when the cone F has been moved into the position for throwing the clutch out it will remain in this position after the lever G has been released, unless one part is rotated relatively to the other, in which case the cone will be forced back as the balls travel round it and the clutch members will be allowed to approach one another for re-engagement under the action of the spring E. It follows therefore that when the clutch is to be thrown in, and the lever G is released, the member A rotates relatively to the member C and thus the balls are made to travel round the cone F, the speed of their travel and the rate of forcing out of the cone, depending upon the difference of speed of rotation between the members A and C. The clutch is, therefore, ideal for smooth starting, as, if the cone C is stationary when the member G is released, the balls H will quickly travel to a position which permits the member A to come into contact with the member C, and as this member is started and increases its speed, the displacement of the balls and the further gripping of the one member with the other, will proceed more slowly until the two members rotate as a solid body. When such a clutch is applied to a motor car, as is well-known the clutch pedal is usually kept depressed when the clutch is disengaged, and released when the clutch is to be thrown in, and it will be appreciated from the above that the described clutch is particularly adapted for use on such vehicles.

In Figure 2 the spring $E^1$ is shown as applied to the cone $C^5$ instead of being placed, as the spring E is, where it bears directly against one of the clutch-members. The spring thus tends at all times to thrust the cone $C^5$ into position for clutching the parts $A^2$ and $C^2$ together, and the angles of the parts in contact with the balls $H^1$ are such that the cone will gradually come to its full clutching position, so that the pick-up of the one clutch-member by the other will take place gradually, as has already been described with reference to Figure 1. The operating lever $G^2$ is employed to withdraw the cone against the action of its spring $E^1$. It will be observed that the operating face of the cone $C^5$ in this case is provided with two different angles; that which first comes into contact with the balls, when the parts are being clutched together, being steeper than that which follows.

In Figure 3 the cone member J takes the form of a sleeve having an internal conical surface which bears against the balls $J^1$. These lie between inclined faces K and $K^1$ of clutch-members $K^2$ and $K^3$ respectively which members are urged together by a spring L. When the operating member $L^1$ is moved in the direction of the arrow, the balls $J^1$ are forced towards the axis of rotation of the clutch, and separate the members $K^2$ $K^3$. On the release of the member $L^1$ relative movement of the members $K^2$ $K^3$ will cause the cone to move in such direction as to permit this ring of balls to again expand and the gripping members to come into contact with each other, the engagement of these members being gradual as has already been described with reference to the members A and C of Figure 1.

A loading spring $L^2$ may be provided for the lever $L^1$, so that there is always a slight tendency to move the cone J in the direction for declutching the gripping-members. This spring should be of such strength that it would tend to allow of a little slip between the clutch-members $K^2$ $K^3$ at slow speeds, but at high speeds the centrifugal action of the balls $J^1$ would tend to thrust the cone J in the opposite direction to that in which the spring $L^2$ would tend to move it, so that the action of this spring would be counteracted and no slipping would occur. The clutch shown in Figure 3 would therefore have the flexibility required at low speeds, and the positive grip that is required at high speeds.

In Figures 4 and 5 the driving-shaft is shown at P and has operatively connected with it a divided clutch-member $P^1$ the two parts of which embrace between them a clutch-member Q which can move axially upon, but rotates with the driven-shaft $Q^1$. Springs $P^2$ tend at all times to force the one half-member $P^1$ towards the other half-member and thus to grip the co-operating member Q between them. Balls R surrounding a cone $R^1$ cooperate with faces $P^3$ and $Q^2$ respectively, the face $P^3$ being formed on a part rigid with the right-hand portion of the double clutch-member $P^1$ and the face $Q^2$ being provided on a sleeve which is fast with the shaft $Q^1$.

The parts are shown in Figures 4 and 5 in the clutching position. To declutch them a lever S is moved in the direction of the arrow, so that it operates against a flange on a sleeve $R^2$ which has connected to it the cone $R^1$. The balls R are thus forced outwards and are wedged in between the faces $P^3$ and $Q^2$. The sleeve which is provided with the face $Q^2$ cannot move axially, as it is carried by the shaft $Q^1$ which is provided with a thrust-bearing $Q^3$ at one end, so that all the movement of the balls has to be accommodated by the right-hand portion of the clutch-member $P^1$ which is thus forced in a direction away from the member Q against the action of its springs $P^2$. As shown in the drawing, the ball bearing at $Q^3$ together with the ball bearing formed by the balls R and the conical face of the right hand member $P^1$ on which they run, constitute in effect a spherical bearing.

To throw the clutch in, the member S is released and the springs $P^2$ then operate to force the right-hand portion of the member $P^1$ towards the left-hand portion of the same, but this movement is controlled by the action of the balls R in the same manner as has been described with reference to the balls H of Figure 1. A loading spring $S^1$ may be provided for the lever S, so that there is always a slight tendency to move the cone $R^1$ in the direction for separating the clutch members $P^1$.

What I claim as my invention and desire to secure by Letters Patent is:—

1. In a friction clutch, the combination of a pair of coaxial clutch members whereof one is movable axially in relation to the other, and each is in operative connection with a coaxial conical face arranged to form one with the other an annular groove, an axially movable sleeve having a conical face extending into the general plane of said groove, balls arranged in said groove in contact with said conical face on said sleeve and adapted to be forced into said groove to move one clutch member axially relatively to the other, a spring tending to move one of said clutch members axially in relation to the other into clutching engagement, and means for moving said sleeve in the direction of the axis of said clutch members, said conical face on said sleeve being disposed at such an angle relatively to the said coaxial conical faces that when said sleeve has been moved into a position wherein the said balls have declutched the clutch members against the action of said spring, the sleeve will remain in its position until rotary movement of one of said two coaxial conical faces takes place in relation to the sleeve.

2. In a friction clutch, the combination of a shaft having a coaxial conical face, a pair of coaxial clutch members whereof one is carried by said shaft, and one is movable axially in relation to the other and has a coaxial conical face arranged to form an annular groove with the former conical face, a spring tending to move one of said clutch members axially in relation to the other into clutching engagement, a sleeve movable axially along said shaft and having a conical face extending into the general plane of said groove, balls arranged in said groove in contact with said conical face on said sleeve and adapted to be forced into said groove to move one clutch member relatively to the other against the action of said spring into a declutching position, and means for moving said sleeve along said shaft, said conical face on said sleeve being disposed at an angle of rest relatively to the said coaxial conical faces such that when said sleeve has declutched the clutch members, the sleeve will remain in its declutching position until rotary movement of one of said two coaxial conical faces takes place in relation to the sleeve.

3. In a friction clutch, the combination of a shaft having a coaxial conical face, a clutch member carried by said shaft, a second clutch member coaxial with the first clutch member capable of an axial engaging movement relatively thereto, and having a coaxial conical face arranged to constitute with the former conical face an annular groove, a spring tending to move one of said clutch members axially in relation to the other, a sleeve movable axially along said shaft and having a conical face extending into the general plane of said groove, balls arranged in said groove in contact with said conical face on said sleeve and adapted to be forced into said groove to move said second clutch member relatively to the first, and means for moving said sleeve along said shaft, said second clutch member having an annular bearing face that is coaxial with said shaft and is arranged to bear against the end of the shaft, said bearing face and one of said conical faces constituting in effect a spherical bearing, said conical face on said sleeve being disposed at such an angle in relation to the said coaxial conical faces that when said sleeve has been moved into a declutching position wherein the said balls have declutched the clutch members against the action of the said spring, the sleeve will remain in its declutching position until rotary movement of one of said two coaxial conical faces takes place in relation to the sleeve.

4. In a friction clutch, the combination of a shaft having a coaxial conical face, a clutch member carried by said shaft, a second clutch member coaxial with the first clutch member, capable of an axial engaging movement relatively thereto, and having a coaxial conical face arranged to constitute with the former conical face an annular groove, a spring tending to press said clutch members together, a sleeve movable axially along said shaft and having a conical face extending into the general plane of said groove, balls arranged in said groove in contact with said conical face on said sleeve, said balls and said conical faces cooperating therewith constituting a ball bearing, a second ball bearing coaxial therewith provided between the end of said shaft and said second clutch member and constituting with the first ball bearing a spherical bearing, and means for moving said sleeve along said shaft, said conical faces on said sleeve being disposed at an angle of rest in relation to the said coaxial conical faces such that when said sleeve has been moved into a declutching position wherein the said balls have declutched the clutch members against the action of said spring, the sleeve will remain in its declutching position until rotary movement of one of said two coaxial conical faces takes place in relation to the sleeve.

5. In a friction clutch, the combination of a shaft having a coaxial conical face, a clutch member mounted to slide axially on said shaft, a two-part clutch member coaxial with and arranged to embrace the first clutch member and movable axially in relation thereto, one part of said two-part clutch member having a coaxial conical face arranged to constitute with the former conical face an annular groove opening towards said shaft, a spring tending to press said clutch members together, a sleeve movable axially along said shaft and having a conical face extending into the general plane of said groove, balls arranged in said groove in contact with said conical face on said sleeve and adapted to be forced into said groove to move said second clutch member relatively to the first, and means for moving said sleeve along said shaft, said conical faces on said sleeve being disposed at such an angle in relation to the said coaxial conical faces that when said sleeve has been moved into a declutching position wherein the said balls have declutched the clutch members against the action of said spring, the sleeve will remain in its declutching position until rotary movement of one of said two coaxial conical faces takes place in relation to the sleeve.

6. In a friction clutch, the combination of a shaft provided with a coaxial conical face, a clutch member carried by said shaft, a second clutch member coaxial with the first clutch member and movable axially relatively thereto and having a coaxial face arranged to constitute with the former conical face an annular groove, a spring tending to press said clutch members together, a sleeve movable axially along said shaft and having a conical face extending into the general plane of said groove, balls arranged in said groove in contact with the conical face on said sleeve and adapted to be forced into said groove to move said second clutch member relatively to the first, means for moving said sleeve along said shaft and a spring operatively connected with said means and tending to move the same in a direction to declutch the clutch against the operation of said first spring, said conical face on said sleeve being disposed at an angle of rest in relation to the said coaxial conical faces such that when said sleeve has been moved into a declutching position wherein the said balls have declutched the clutch members against the action of said first spring said sleeve will remain in its declutched position until rotary movement of one of said coaxial faces takes place in relation to the sleeve.

7. In a clutch, the combination of coacting clutch members, related conical surfaces, shafts for said clutch members, balls operatively related to said conical surfaces, means for forcing said balls between said conical surfaces to actuate said clutch members and holding said members in the actuated position while at rest, and means for bringing said members into their original position automatically upon the rotation of one of said members relative to the other, substantially as described.

In testimony whereof I affix my signature.

ALBERT HENRY GODFREY GIRLING.